United States Patent
Leu

(10) Patent No.: US 8,625,619 B2
(45) Date of Patent: Jan. 7, 2014

(54) DOMAIN GATEWAY CONTROL SYSTEM AND METHOD THEREOF

(75) Inventor: Kuen-Long Leu, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 46 days.

(21) Appl. No.: 13/486,037

(22) Filed: Jun. 1, 2012

(65) Prior Publication Data

US 2012/0307833 A1  Dec. 6, 2012

(30) Foreign Application Priority Data

Jun. 1, 2011 (TW) .............................. 100119137 A

(51) Int. Cl.
*H04L 12/28* (2006.01)
*H04J 3/16* (2006.01)

(52) U.S. Cl.
USPC .......................................... 370/401; 370/466

(58) Field of Classification Search
None
See application file for complete search history.

(56) References Cited

U.S. PATENT DOCUMENTS

| | | | |
|---|---|---|---|
| 6,363,065 B1* | 3/2002 | Thornton et al. | 370/352 |
| 6,876,654 B1* | 4/2005 | Hegde | 370/392 |
| 7,002,973 B2* | 2/2006 | MeLampy et al. | 370/401 |
| 7,028,092 B2* | 4/2006 | MeLampy et al. | 709/230 |
| 7,031,288 B2* | 4/2006 | Ogier | 370/338 |
| 8,451,845 B2* | 5/2013 | Boucadair et al. | 370/393 |
| 2001/0040895 A1* | 11/2001 | Templin | 370/466 |
| 2002/0012320 A1* | 1/2002 | Ogier et al. | 370/252 |
| 2002/0101860 A1* | 8/2002 | Thornton et al. | 370/352 |

* cited by examiner

*Primary Examiner* — Clemence Han
(74) *Attorney, Agent, or Firm* — Muncy, Geissler, Olds & Lowe, PLLC

(57) ABSTRACT

A domain gateway control system and a method are provided. The system includes a gateway device configured at an interface of a domain. The gateway device is further linked to more than one Ethernet. When the gateway device analyzes a data packet acquired from an Ethernet and detects that a destination MAC address data of the data packet points to a net device in the domain, the gateway device records a gateway MAC address data in a source MAC field of the data packet and records a domain type code data corresponding to the domain in an Ethernet-type field of the data packet to convert the data packet into a domain packet used in the domain. Any net device in the domain that acquires the domain packet learns the gateway MAC address data, and does not learn a device MAC address data of an external device of the Ethernet.

20 Claims, 12 Drawing Sheets

| | Destination MAC field | Source MAC field | Ethernet-type field | Data field |
|---|---|---|---|---|
| (1) 51a | X1-X1-X1-X1-X1-X1 | A1-A1-A1-A1-A1-A1 | 0800 | XXXXXXXXXXXXXXXXXXXX...... |

| | Destination MAC field | Source MAC field | Ethernet-type field | Data field |
|---|---|---|---|---|
| (2) 51b | D1-D1-D1-D1-D1-D1 | A1-A1-A1-A1-A1-A1 | 0800 | XXXXXXXXXXXXXXXXXXXX...... |

| | Destination MAC field | Source MAC field | Ethernet-type field | Data field |
|---|---|---|---|---|
| (3) 61a | D1-D1-D1-D1-D1-D1 | G1-G1-G1-G1-G1-G1 | 0811 | XXXXXXXXXXXXXXXXXXXX...... |

| | Destination MAC field | Source MAC field | Ethernet-type field | Data field |
|---|---|---|---|---|
| (4) 61b | D1-D1-D1-D1-D1-D1 | G1-G1-G1-G1-G1-G1 | 0811 | A1-A1-A1-A1-A1-A1 | 0800 | XXXXXXXXXXXXXXXXXXXX... |

FIG. 3

DOMAIN GATEWAY CONTROL SYSTEM AND METHOD THEREOF

CROSS-REFERENCE TO RELATED APPLICATION

This application claims the benefit of Taiwan Patent Application No. 100119137, filed on Jun. 1, 2011, which is hereby incorporated by reference for all purposes as if fully set forth herein.

BACKGROUND OF THE INVENTION

1. Field of Invention

The present invention relates to a domain gateway control system and its method. More particularly, the invention relates to a domain gateway control system and its method in which a gateway device is used as a packet format conversion device between a domain and an Ethernet to make net devices in the domain form a network group dedicated to the domain.

2. Related Art

In the prior art, upon acquiring a data packet transported over a network, an L2 (data link layer) net device compares a destination Media Access Control (MAC) address data of the data packet with a device MAC table data built in the net device, and searches in the device MAC table data for port number data of a communication port corresponding to the destination MAC address data to output the data packet through the corresponding communication port. However, when no port number data of communication port corresponding to the destination MAC address data exists in the device MAC table data, the net device broadcasts the data packet from all communication ports of the net device except the communication port acquiring the data packet.

Meanwhile, the net device also compares a source MAC address data of the data packet packet with the device MAC table data. If the source MAC address data does not exist in the device MAC table data, the source MAC address data and port number data of the communication port acquiring the data packet are recorded in the device MAC table data. On the contrary, when the source MAC address data exists in the device MAC table data, the net device compares the source MAC address data and port number data of the communication port acquiring the data packet with data recorded in the device MAC table data. If the source MAC address data and the port number data of communication port are the same as the data recorded in the device MAC table data, the data in the device MAC table data remains unchanged. If the port number data of communication port which corresponds to the source MAC address data is different from the data recorded in the device MAC table data, depending on the demands of the designer, the source MAC address data and the corresponding port number data of communication port will either be updated in the device MAC table data or the port number data of communication port corresponding to the source MAC address data will be added in the device MAC table data.

For example, FIG. 1 is a schematic view of connection of net devices in the prior art. Connection architecture of an L2-net device-switch with other net devices is provided for illustration. In FIG. 1, a switch 1 is connected to a net device B and a net device C. When a remote net device A needs to communicate with net device B, data packets are transmitted between net device A and net device B through the network, and the switch 1 records source MAC address data of the data packets and port number data of a communication port receiving the data packets respectively.

It is assumed that the switch 1 acquires, through a No. I communication port 11, a data packet P1 transmitted by the net device A. The source MAC address data of the data packet P1 is the MAC of the net device A, and the destination MAC address data of the data packet P1 is the MAC address of the net device B. The switch 1 compares the source MAC address data of the data packet P1 with a device MAC table data. If the MAC address of net device B is stored in the device MAC table data and the MAC address of net device B corresponds to the No. II communication port 12 of the switch 1, the switch 1 outputs the data packet P1 through the No. II communication port 12 to transport the data packet P1 to net device B. On the contrary, if the MAC address of net device B is not stored in the MAC table data, the switch 1 broadcasts the data packet P1 through all communication ports except the No. I communication port 11.

If the switch 1 determines the MAC address of net device A, it will record the MAC address of net device A and the No. I communication port 11 corresponding to the MAC address of net device A in the MAC table data.

Next, it is assumed that the switch 1 acquires, through the No. II communication port 12, a data packet P2 transmitted by net device B. The source MAC address data of the data packet P2 is the MAC address of the net device B, and the destination MAC address data of the data packet P2 is the MAC address of the net device A. If the switch 1 determines that the MAC address of net device B is not in the system, the MAC address of the net device B will be recorded in the MAC table data by the switch 1. However, if the switch 1 determines that the MAC address of the net device A is already learnt and knows that the MAC address of the net device A corresponds to the No. I communication port 11, the switch will output the data packet P2 output from the net device B through the No. I communication port 11.

Next, it is assumed that the switch 1 acquires a data packet P3 of the net device C through a No. III communication port 13 and the data packet P3 points to the net device B or the net device A. When the switch 1 first learns a MAC address of the net device C from the data packet P3, it will to update the MAC table data. Subsequently, the switch 1 outputs the data packet P3 heading for net device A directly through the No. I communication port 11, or uses the No. II communication port 12 to output the data packet P3 heading for net device B.

If only the L2-net protocol is applied, the other net devices can also perform operations that include a learning operation of a source MAC address data of a data packet and a forwarding operation of the data packet. As the number of net devices increases gradually and the network scale gets larger gradually, each net device needs to learn and record an increased number of MAC addresses. The net devices must have storage units having a larger memory capacity to record MAC addresses of other net devices. In addition, even if each net device has a built-in MAC update and stripping mechanism to perform better update and processing on data in the MAC table data, the demands for the memory capacity of the storage unit cannot be effectively restrained. Additionally, once data stored in the storage unit reaches an upper limit of the memory capacity, even if the MAC update and stripping mechanism are used, a processor of the net device cannot be prevented from continuously performing a MAC learning operation, and, as a result, extra software or hardware resources must be provided for the processor to assist the MAC learning operation, resulting in unnecessary resource consumption. Furthermore, with the demands for increasing memory capacity, the manufacturing costs of the storage units and net devices in which the storage units are applied increase accordingly.

Therefore, the problem that manufacturers encounter is how to use net devices with limited memory capacity in net architectures of different scales.

SUMMARY OF THE INVENTION

The present invention is directed to a domain gateway control technology, in which data packet formats between a domain and an Ethernet are converted so that net devices in the domain form a unique device group in the domain.

In order to solve the above technical problems, the present invention discloses a domain gateway control system, which comprises a domain and a gateway device. The gateway device serves as an interface of the domain, and is linked to an Ethernet.

A domain packet is transmitted in the domain, and an Ethernet-type field of the domain packet records a domain type code data corresponding to the domain.

The gateway device is used to analyze a destination MAC address data of the data packet when acquiring the data packet from the Ethernet. When the gateway device determines that the destination MAC address data of the first data packet points to the domain, the gateway device uses a MAC address Group Protocol (MAGP) information to convert the data packet into a domain packet, and forwards the domain packet to the domain. The MAGP information comprises: a recorded gateway MAC address data of the gateway device in a source MAC field comprised in the data packet and the recorded domain type code data in an Ethernet-type field of the data packet.

In the domain gateway control system disclosed by the present invention, each net device in the domain comprises a device MAC table data. When any net device acquires a domain packet, the gateway MAC address data of the gateway device is the source MAC address data learnt by the net device, and the gateway MAC address data is recorded in the device MAC table data.

In the domain gateway control system disclosed by the present invention, the gateway device further acquires a second domain packet from the domain, which is generated by any one of the net devices in the domain. A packet format of the second domain packet is equivalent to that of the first domain packet. When the gateway device analyzes that the destination MAC address data of the second domain packet points to the gateway device, and a data field includes an off-net destination MAC address data directed to the Ethernet and an Ethernet-type code data corresponding to the Ethernet, the gateway device updates the destination MAC address data field of the second domain packet with the off-net destination MAC address data and updates an Ethernet-type field of the second domain packet with the Ethernet-type code data to convert the second domain packet into a second data packet and forward the second data packet to the Ethernet, which is received by an external device corresponding to the off-net destination MAC address data.

In order to solve the technical problems, the present invention discloses a domain gateway control method, which is applied to a gateway device configured at an interface of a domain. The gateway device is linked to an Ethernet. The domain gateway control method comprises: acquiring a first data packet from the Ethernet; analyzing a destination MAC address data of the first data packet; and when the gateway device determines that the destination MAC address data comprised in the first data packet points to the domain, MAGP information is used to convert the first data packet into a first domain packet, and the first domain packet is forwarded to the domain. The MAGP information comprises a recorded gateway MAC address data of the gateway device as a source MAC address data of the first data packet and a recorded domain type code data corresponding to the domain as an Ethernet-type code data of the first data packet.

The characteristics of the present invention are as follows. A gateway device is used as a packet conversion device between a domain and an Ethernet, meanwhile a gateway MAC address data of the gateway device is updated to be directed to a source MAC address data of a data packet of the domain. Regardless of the size of the domain, each net device in the domain can at most only learn MACs of all of the net devices in the domain, which reduces the times that each net device learns the MACs, and meanwhile reduces demands for memory capacity for the MACs of the net devices. In addition, once the demands for the memory capacity decrease, manufacturers no longer need to configure storage units with large memory capacity in net devices, and thereby effectively reduce design and manufacturing costs of the net devices. In addition, operation time and resources of a processor of the net device can be prevented from being occupied excessively and improve operative performance of the net device indirectly. Furthermore, net devices in each domain form a device group dedicated to the domain, which makes it convenient for network management personnel to manage relevant net architectures effectively.

BRIEF DESCRIPTION OF THE DRAWINGS

The present invention will become more fully understood from the detailed description given herein below and the drawings, which are example embodiments of the invention and are not be the only embodiments of the present invention:

FIG. 3 is a schematic view of packet structure conversion in a domain gateway control system according to an embodiment of the present invention;

DETAILED DESCRIPTION OF THE INVENTION

Preferred embodiments of the present invention are illustrated below in detail with reference to the accompanying drawings.

Figure 1:
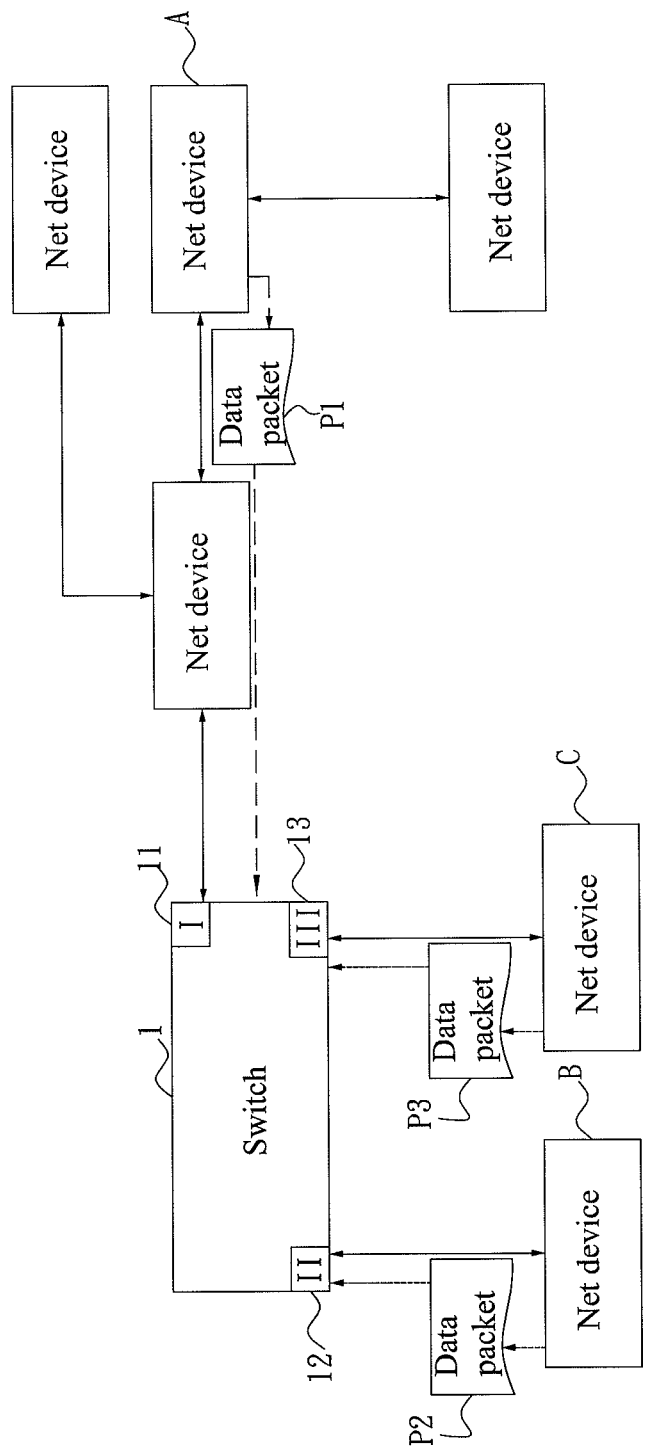
FIG. 1 is a schematic view of an embodiment's connection of net devices in the prior art.
Figure 2:
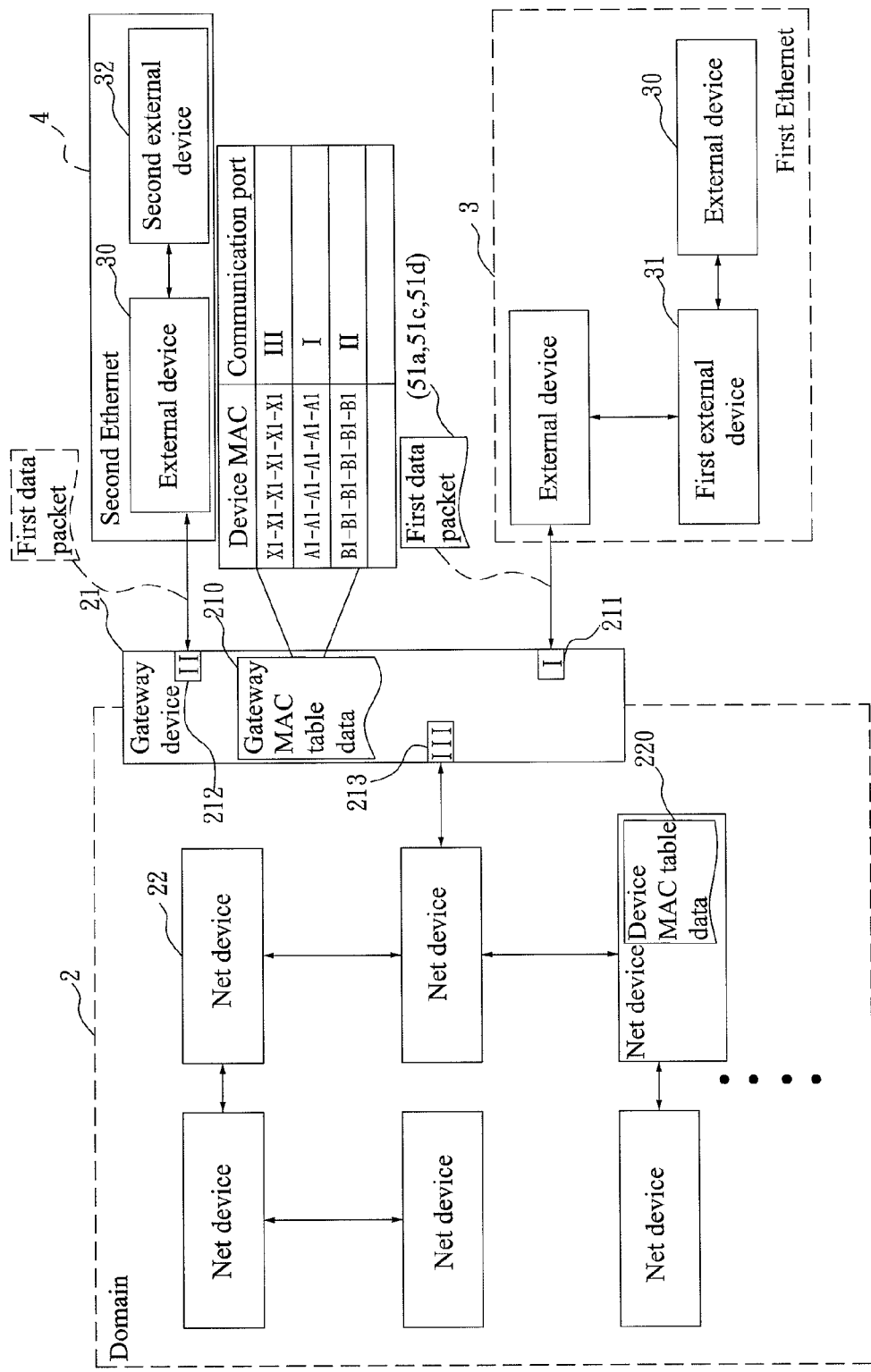
FIG. 2 is a schematic system architecture diagram in a domain gateway control system according to an embodiment of the present invention.

FIG. 2 is a schematic system architecture diagram in a domain gateway control system according to an embodiment of the present invention. A system disclosed by the present invention includes a domain 2 and a gateway device 21. The gateway device 21 is configured at an interface (a data transmission interface) of the domain 2, and is linked to a first Ethernet 3.

More than one net device 22 is configured in the domain 2. In the domain 2, domain packets dedicated to the domain 2 and complying with an MAGP information are transmitted between the net devices 22. The MAGP information has various rules, which are illustrated one by one in the following embodiments.

In this embodiment, the gateway device 21 is an L2-net device (for example, a device of a relevant type, such as a network switch and a bridge). The first Ethernet 3 linked to the gateway device 21 is configured with more than one external device 30. However, the external devices 30 and the net devices 22 in the domain 2 may be regarded as devices of the same protocol, and devices of different protocols are also applicable.

In addition, the net devices 22, the gateway device 21 and the external devices 30 have an identifying MAC in the net respectively, which complies with the MAC address format. For convenience of the following description, the MAC address of the net device 22 is temporarily called a device MAC address data, and the MAC address of the gateway device 21 is temporarily called a gateway MAC address data.

The gateway device 21, the net devices 22 in the domain 2, and the external devices 30 all comply with an L2 network communication protocol, record a MAC address as a source MAC address data of a packet when the packet is generated, and record a MAC address of a destination device as a destination MAC address data of the packet.

Upon acquiring various data packets from the net, the gateway device 21 and the net devices 22 in the domain 2 learn the source MAC address data in the data packet, acquire the communication port number data of the communication port of the data packet, and record the source MAC address data and the communication port number data in a device MAC table data 220 thereof. For convenience of description, the device MAC table data included in the gateway device 21 is also called a gateway MAC table data 210.

As shown in FIG. 2, the gateway device 21 acquires a first data packet 51a from the first Ethernet 3, which is sent or forwarded by any one of the external devices 30 of the first Ethernet 3. The gateway device 21 receives the first data packet 51a from the external device 30 adjacent to the gateway device 21. Referring to FIG. 3, FIG. 3 is a schematic view of packet structure conversion in a domain gateway control system according to an embodiment of the present invention. A packet structure of the first data packet 51a, as shown by a No. (1) structure in FIG. 3, includes a destination MAC field, a source MAC field, an Ethernet-type field and a data field.

The gateway device 21 reads the destination MAC field of the first data packet 51a, performs MAC matching on the destination MAC field with the gateway MAC table data 210 thereof, and determines which device the destination MAC address data of the first data packet 51a points to. When the gateway device 21 determines that the destination MAC address data of the first data packet 51a is learned by the gateway device 21 and recorded in the gateway MAC table data 210, the gateway device 21 reads the destination MAC address data and a communication port number data corresponding to the destination MAC address data from the gateway MAC table data 210, and forwards the first data packet 51a from the communication port corresponding to the communication port number data.

As shown in FIG. 2, it is assumed that the first data packet 51a is generated by a first external device 31, the destination MAC address data is X1-X1-X1-X1-X1-X1 (hexadecimal), the source MAC address data is A1-A1-A1-A1-A1-A1 (hexadecimal), the communication port number data recorded in the gateway MAC table data 210 that corresponds to the destination MAC address data (X1-X1-X1-X1-X1-X1) is port No. III, and the gateway device 21 forwards the first data packet 51a from a No. III communication port 213. Before forwarding, the gateway device 21 learns the source MAC address data of the first data packet 51a. It is assumed that the gateway device 21 receives the first data packet 51a through a No. I communication port 211, the gateway device 21 learns the source MAC address data of the first data packet 51a and records the source MAC address data and the communication port number data (A1-A1-A1-A1-A1-A1/No. I) in the gateway MAC table data 210. Once the gateway device 21 has learned the source MAC address data, the gateway device 21 does not learn the source MAC address data repeatedly. The learning procedures of the following devices are the same as or similar to the above learning procedures, which are represented by 'learning' hereinafter. Only the characteristics of the architecture of the system are illustrated, and in the embodiments, a content structure of a domain is illustrated through an appropriate architecture mode according to demands, and is not limited to the system architecture illustrated in FIG. 2.

Figure 4:
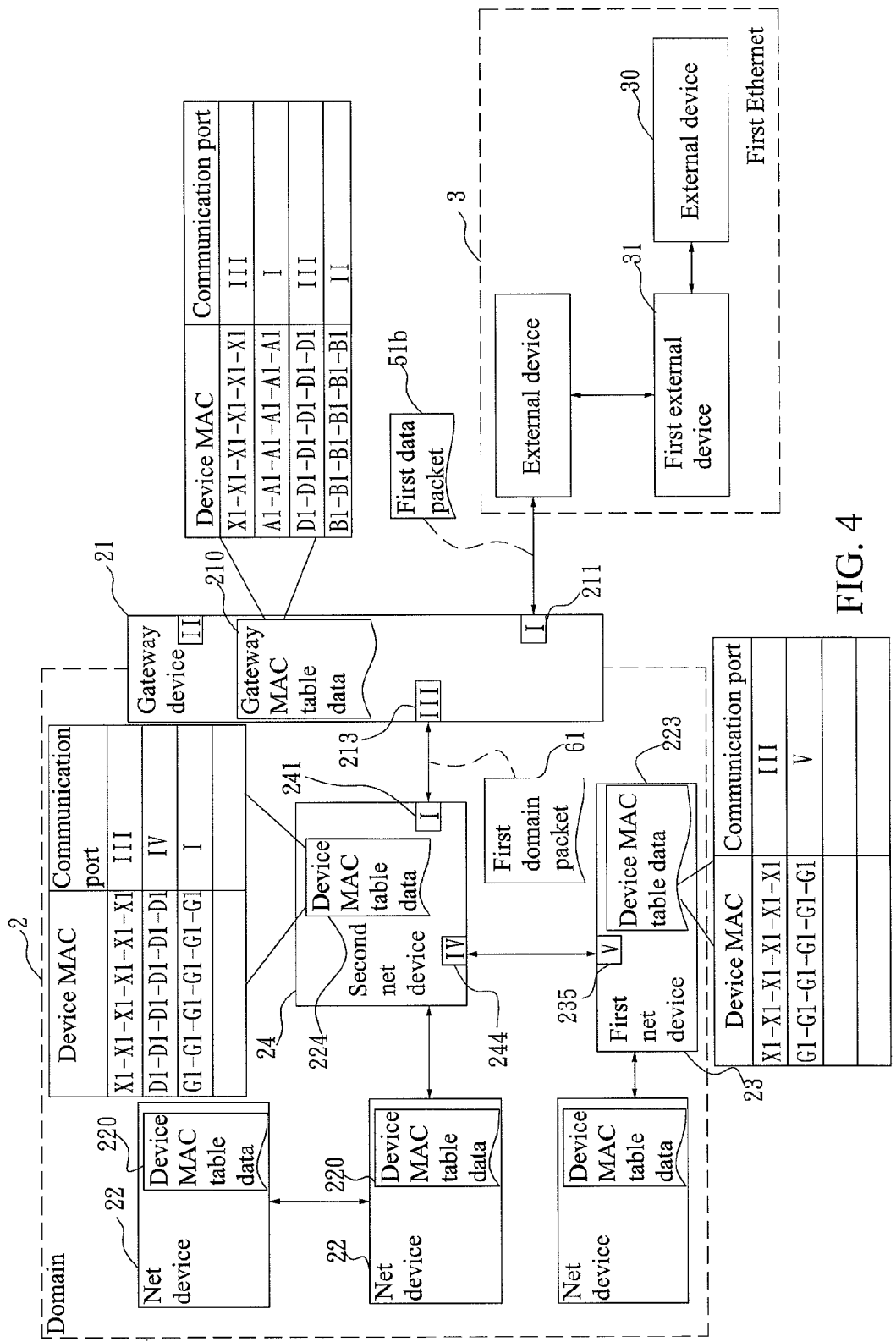
FIG. 4 is a schematic view of forwarding a packet to a domain in a domain gateway control system according to an embodiment of the present invention.

FIG. 4 is a schematic view of a packet being forwarded to a domain in a domain gateway control system according to an embodiment of the present invention and refers to a No. (2) packet structure and a No. (3) packet structure in FIG. 3. Upon acquiring a first data packet 51b, the gateway device 21 analyzes the first data packet 51b. When the gateway device 21 determines that a destination MAC address data of the first data packet 51b points to the domain 2 governed by the gateway device 21, or when the gateway device 21 must perform broadcasting to forward the first data packet 51b to the domain 2 because the gateway device 21 fails to know an exact destination MAC address data of the first data packet 51b from the gateway MAC table data 210, the gateway device 21 converts the first data packet 51b in to a first domain packet 61 (in FIG. 4) according to the MAGP information. Two conversion modes are as follows.

(1) Substitution. The gateway device 21 records the gateway MAC address data in the source MAC field of the first data packet 51b and records a domain type code data of the corresponding domain 2 in an Ethernet-type field of the first data packet 51b.

As shown in FIG. 4, it is assumed that the gateway device 21 is linked to the domain 2 through the No. III communication port 213, and the domain type code data corresponding to the domain 2 is 0811 (hexadecimal), the source MAC address data of the first data packet 51b is equivalent to the source MAC address data of the first data packet 51a, that is A1-A-A1-A1-A1-A1, the destination MAC address data of the first data packet 51b is D1-D1-D1-D1-D1-D1 (hexadecimal), and an Ethernet-type code data is 0800 (hexadecimal). When the gateway device 21 knows from the gateway MAC table data 210 that the destination MAC address data of the first data packet 51*b* points to the domain 2, or when the first data packet 51*b* must be forwarded to the domain 2 in a broadcast manner, the gateway device 21 records the gateway MAC address data, that is G1-G1-G1-G1-G1-G1 (hexadecimal), in the source MAC field of the first data packet 51*b* and records the domain type code data 0811 (hexadecimal) in the Ethernet-type field of the first data packet 51*b*. The first data packet 51*b* is converted from the No. (2) packet structure as shown in FIG. 3 into the No. (3) packet structure as shown in FIG. 3, thereby forming a first domain packet 61*a* (a packet format of the first domain packet 61).

(2) Insertion. The gateway device 21 inserts the gateway MAC address data and the domain type code data into the first data packet 51*b*, and an insertion position is between the destination MAC field and the source MAC field of the first data packet 51*b*, thereby forming a first domain packet 61*b* (also a packet format of the first domain packet 61). A difference between the insertion mode and the update mode lies in that the original source MAC address data and the Ethernet-type code data of the first data packet 51*b* are regarded as data in a data field of the first domain packet 61*b*, and the data length of the first domain packet 61*b* is greater than the length of the first data packet 51*b*. In this embodiment, a read length of the data field is increased.

The setting of a packet read length of the first domain packets (61, 61*a*, 61*b*) can be recorded in a header of the first domain packets (61, 61*a*, 61*b*), or in an executive system, firmware, or software of the net devices 22 and the gateway device 21 in the domain 2. When it is preset to read the domain packet, the packet read length shall be used.

FIG. 4 is a schematic view of forwarding a packet to a domain in a domain gateway control system according to an embodiment of the present invention and refers to the No. (2) packet structure and the No. (3) packet structure in FIG. 3. As shown in FIG. 4, it is assumed that the communication port through which the gateway device 21 is linked to the domain 2 is the No. III communication port 213, the domain type code data corresponding to the domain 2 is 0811 (hexadecimal), and the structure of the first data packet 51*b* is as shown in FIG. 3. When the gateway device 21 knows from the gateway MAC table data 210 that the destination MAC address data of the first data packet 51*b* points to the domain 2, or when the first data packet 51*b* must be forwarded to the domain 2 in a broadcast manner, the gateway device 21 inserts the gateway MAC address data, that is, G1-G1-G1-G1-G1-G1 (hexadecimal) and the domain type code data 0811 (hexadecimal) between the destination MAC field and the source MAC field of the first data packet 51*b*, and the original source MAC address data (A1-A1-A1-A1-A1-A1) and the Ethernet-type code data (0800) are regarded as data of the data field. The first data packet 51*b* is converted from the No. (2) packet structure as shown in FIG. 3 into the No. (4) packet structure as shown in FIG. 3, thereby forming the first domain packet 61*b*. For convenience of description, the first domain packet 61*b* formed in an insertion mode is always used as an example below.

The first domain packet 61*b* is transmitted to the domain 2. Upon acquiring the first domain packet 61*b*, any net device 22 first determines whether a destination MAC address data of the first domain packet 61*b* points to a device MAC address data. If not, the net device 22 matches the destination MAC address data of the first domain packet 61*b* with the device MAC table data 220 to find a communication port corresponding to the destination MAC address data of the first domain packet 61*b* and use the communication port for forwarding. Accordingly, before forwarding, the net device 22 acquiring the first domain packet 61*b* also learns the source MAC address data of the first domain packet 61*b* to update the device MAC table data 220. The first domain packet 61*b* is either an external data packet forwarded by the gateway device 21 or generated by the gateway device 21. The source MAC address data of the first domain packet 61*b* is a gateway MAC address data, and the original source MAC address data is recorded in the data field of the first domain packet 61*b*. Therefore, in the a domain 2, the net device 22 acquiring the first domain packet 61*b* does not learn the device MAC address data of the first external device 31, A1-A1-A1-A1-A1-A1.

As shown in FIG. 4, it is assumed that the MAC of a first net device 23 is D1-D1-D1-D1-D1-D1. The second net device 24 is linked to the No. III communication port 213 of the gateway device 21 through a No. I communication port 241 and is linked to a No. V communication port 235 of the first net device 23 through a No. IV communication port 244 respectively. A device MAC table data 224 included in the second net device 24 records the MAC of the first net device 23 and the communication port No. IV corresponding to the MAC.

Upon acquiring the first domain packet 61*b*, the second net device 24 analyzes if the destination MAC address data is inconsistent with a device MAC address data and reads the device MAC table data 224 to learn that the first domain packet 61*b* shall be forwarded from the No. IV communication port 244. Before forwarding, the second net device 24 learns the source MAC address data of the first domain packet 61*b*. Meanwhile, if the second net device 24 determines that the second net device 24 does not learn the source MAC address data of the first domain packet 61*b* (the gateway MAC address data G1-G1-G1-G1-G1-G1), the second net device 24 records the source MAC address data and the No. I communication port in the device MAC table data 224 of the second net device 24.

The first domain packet 61*b* is received by the No. V communication port 235 of the first net device 23. The first net device 23 analyzes that the destination MAC address data of the first domain packet 61*b* matches the device MAC address data, and the first net device 23 learns the source MAC address data of the first domain packet 61*b* to update the device MAC table data 223. Similarly, the source MAC address data learnt by the first net device 23 from the first domain packet 61*b* is also the gateway MAC address data. Furthermore, the first net device 23 acquires the domain type code data (0811) from the Ethernet-type field of the first domain packet 61*b*, and knows that the first domain packet 61*b* complies with the MAGP information, to find the original source MAC address data (the device MAC address data A1-A1-A1-A1-A1-A1 of the first external device 31) in the data field of the first domain packet 61*b* and the Ethernet-type code data (0800) corresponding to the first Ethernet 3. Alternatively, by using the MAGP information, The first data packet 61*b* is converted from the No. (4) packet structure as shown in FIG. 3 into the No. (2) packet structure as shown in FIG. 3, the first domain packet 61*b* is recovered to the first data packet 51*b* for subsequent operations.

Referring to FIG. 2, in this embodiment, the gateway device 21 is further linked to a second Ethernet 4. When the gateway device 21 acquires a first data packet 51*c* from the first Ethernet 3, and analyzes that a destination MAC address data of the first data packet 51*c* points to the second Ethernet 4, the gateway device 21 forwards the first data packet 51*c* to the second Ethernet 4.

As shown in FIG. 2, for example, it is assumed that the second Ethernet 4 has a second external device 32, the device MAC address data of the second external device 32 is B1-B1-B1-B1-B1-B1, the gateway device 21 is linked to the second external device 32 through a No. II communication port 212, and the MAC B1-B1-B1-B1-B1-B1 and the communication port No. II are made into pairs and recorded in the gateway MAC table data 210.

The gateway device 21 acquires the first data packet 51c from the first Ethernet 3, and analyzes the destination MAC address data of the first data packet 51c. The gateway device 21 knows from the gateway MAC table data 210 that the destination MAC address data of the first data packet 51c is B1-B1-B1-B1-B1-B1, which points to the second Ethernet 4 rather than to the domain 2. After learning the source MAC address data of the first data packet 51c, the gateway device 21 uses the No. II communication port 212 to forward the first data packet 51c to the second Ethernet 4.

Referring to FIG. 2, the gateway device 21 acquires a first data packet 51d from the first Ethernet 3 and analyzes the first data packet 51d. When the gateway device determines that the destination MAC address data of the first data packet 51d matches the gateway MAC address data, the gateway device 21 directly receives the first data packet 51d. Also, after learning the source MAC address data of the first data packet 51d, the gateway device 21 no longer forwards the first data packet 51d.

Figure 5:
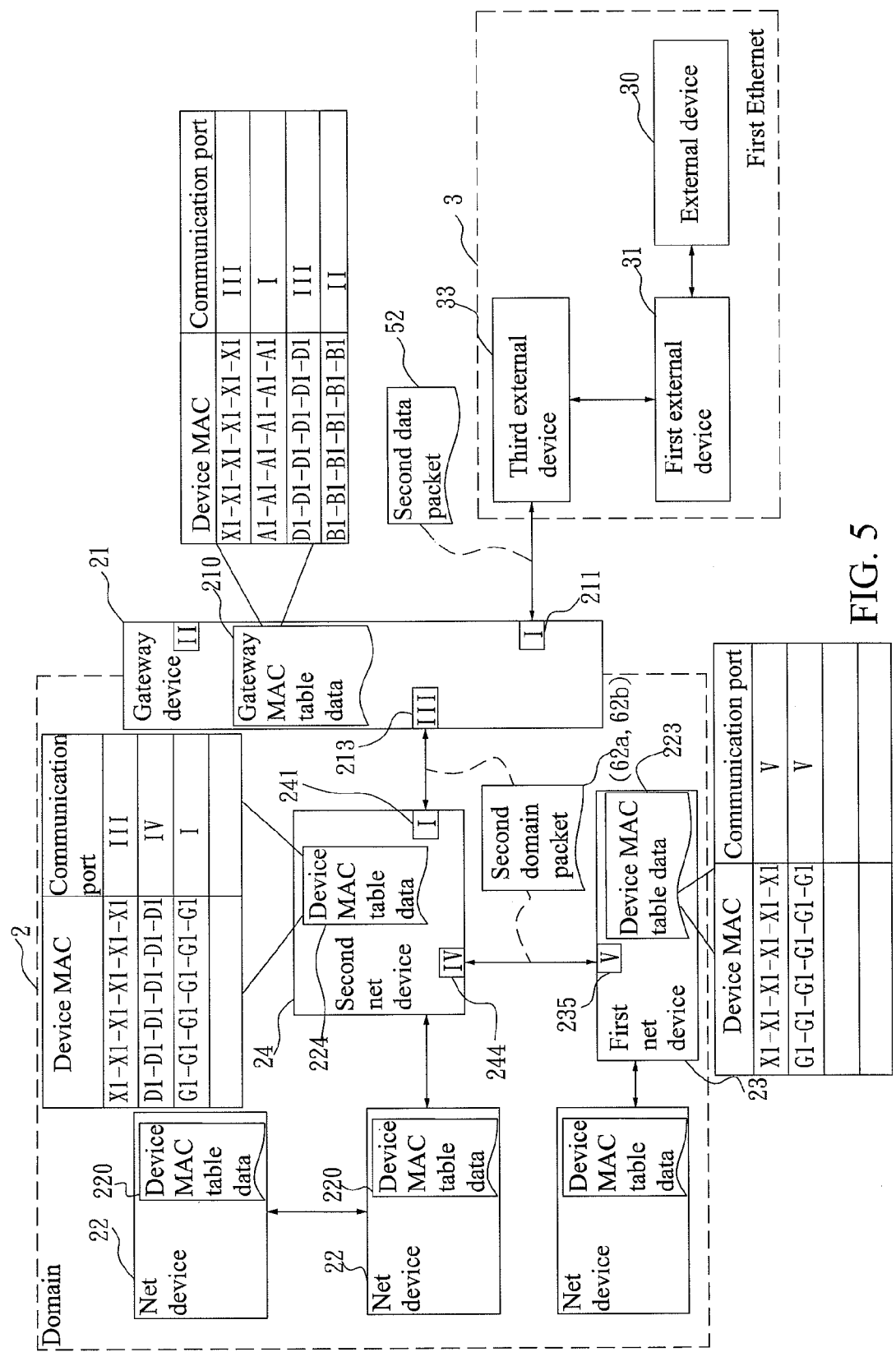
FIG. 5 is a schematic view of sending out a domain packet in a domain gateway control system according to an embodiment of the present invention.

FIG. 5 is a schematic view of sending out a domain packet in a domain gateway control system according to an embodiment of the present invention. In this embodiment, a second domain packet 62a is generated by any one of the net devices 22 in the domain, which complies with the domain sending out mode included in the MAGP information, that is, the destination MAC address data of the second domain packet 62a points to the gateway device 21, the device MAC address data of the net device 22 generating the second domain packet 62a is recorded as the source MAC address data of the second domain packet 62a, the domain type code data is recorded in an Ethernet-type field of the second domain packet 62a, an off-net destination MAC address data and an Ethernet-type code data corresponding to an Ethernet are recorded in a data field of the second domain packet 62a, and in addition the off-net destination MAC address data is the device MAC address data of any one of the external devices 30.

Figure 6:
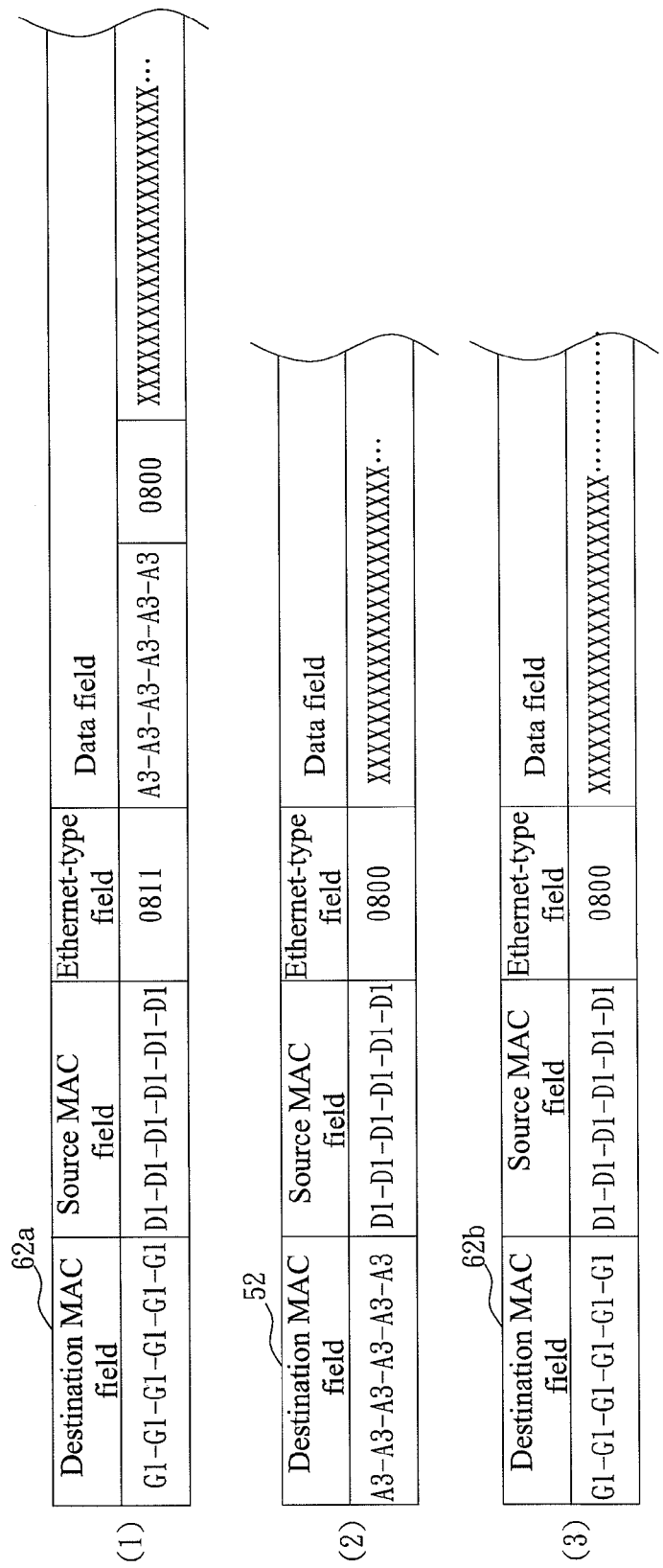
FIG. 6 is a schematic view of domain packet structure conversion in a domain gateway control system according to an embodiment of the present invention.

FIG. 6 is a schematic view of domain packet structure conversion in a domain gateway control system according to the present invention. As shown in FIG. 5 and FIG. 6, the first net device 23 generates the second domain packet 62a, and the destination MAC address data of the second domain packet 62a points to the gateway device 21, that is, G1-G1-G1-G1-G1-G1. The source MAC address data of the second domain packet 62a is a device MAC address data of the first net device 23 (D1-D1-D1-D1-D1-D1). The off-net destination MAC address data is, by using a third external device 33 in the first Ethernet 3 as an example, the device MAC address data A3-A3-A3-A3-A3-A3. The device MAC address data of the third external device 33 and the Ethernet-type code data 0800 (hexadecimal) corresponding to the first Ethernet 3 are recorded in the data field of the second domain packet 62a, thereby forming the second domain packet 62a (No. (1) packet structure as shown in FIG. 6, which is also a packet format covered by the MAGP information).

The first net device 23 transports the second domain packet 62a through the No. V communication port 235 according to the device MAC table data 223. When any one of the net devices 22 acquires the second domain packet 62a, the net device 22 matches the destination MAC address data of the second domain packet 62a with the device MAC table data 220 to find a communication port corresponding to the destination MAC address data of the second domain packet 62a and uses the communication port for forwarding. Accordingly, before forwarding, the net device 22 acquiring the second domain packet 62a also learns the source MAC address data of the second domain packet 62a to update the device MAC table data 220.

As shown in FIG. 5 and FIG. 6, for example, the second net device 24 acquires the second domain packet 62a through the No. IV communication port 244, and analyzes if the destination MAC address data of the second domain packet 62a is different from the device MAC address data. The second net device 24 reads the device MAC table data 224 to know that the second domain packet 62a shall be forwarded from the No. I communication port 241. Before forwarding, the second net device 24 also learns the source MAC address data of the second domain packet 62a to update the device MAC table data 224.

As shown in FIG. 5 and FIG. 6, upon acquiring the second domain packet 62a, the gateway device 21 analyzes the second domain packet 62a to decide whether to forward the second domain packet 62a. If the gateway device 21 analyzes that the destination MAC address data of the second domain packet 62a matches the gateway MAC address data (G1-G1-G1-G1-G1-G1), the domain type code data (0811) is recorded in the Ethernet-type field of the second domain packet 62a, and the off-net destination MAC address data (the device MAC address data A3-A3-A3-A3-A3-A3 of the third external device 33) and the Ethernet-type code data (0800) of the corresponding first Ethernet 3 are recorded in the data field of the second domain packet 62a, the gateway device 21 confirms that the second domain packet 62a complies with a domain packet sending out format in the MAGP information.

The gateway device 21 records the off-net destination MAC address data (A3-A3-A3-A3-A3-A3) in a destination MAC address data field of the second domain packet 62a again, and records the Ethernet-type code data (0800) in the Ethernet-type field of the second domain packet 62a. Alternatively, the gateway device 21 strips the original destination MAC field and Ethernet-type field of the second domain packet 62a and uses the off-net destination MAC address data and the Ethernet-type code data in the data field as data replacement. The second domain packet 62a is converted from the No. (1) packet structure as shown in FIG. 6 into a No. (2) packet structure as shown in FIG. 6 and thereby forms a second data packet 52. Subsequently, the gateway device 21 forwards second data packet 52 to the first Ethernet 3. Before converting the packet format, the gateway device 21 also learns the source MAC address data (D1-D1-D1-D1-D1) of the second domain packet 62a to update the gateway MAC table data 210.

Refer to FIG. 5 and FIG. 6 for understanding a packet receiving mode. In this embodiment, the first net device 23 generates a second domain packet 62b, and the destination MAC address data of the second domain packet 62b points to the gateway device 21 (G1-G1-G1-G1-G1-G1). A source MAC address data of the second domain packet 62b is the device MAC address data of the first net device 23 (D1-D1-D1-D1-D1). A difference from the aforementioned examples lies in that a data field of the second domain packet 62b does record any off-net destination MAC address data. That is to say, the second domain packet 62b is not transmitted to any Ethernet. In addition, the gateway device 21 is an intermediary device between the domain 2 and the Ethernet. The gateway device 21 has the capability of parsing a normal data packet and a domain packet dedicated to the domain 2. Therefore, before any one of the net devices 22 in the domain 2 transmits data to the gateway device 21, only a domain packet complying with a normal data packet protocol must be established (the MAGP information is not required). Therefore, in this embodiment, the second domain packet 62b established by the first net device 23 (a No. (3) packet structure as shown in FIG. 6) is an L2-network communication packet format.

Upon acquiring the second domain packet 62b, the gateway device 21 analyzes the packet structure of the second domain packet 62b and data included in the second domain packet 62b. As shown in FIG. 5 and FIG. 6, the gateway device 21 analyzes that the destination MAC address data of the second domain packet 62b matches the gateway MAC address data (G1-G1-G1-G1-G1-G1), and the data field of the second domain packet 62b does not record any off-net destination MAC address data, so the gateway device 21 confirms that the second domain packet 62b shall be received by the gateway device 21. The gateway device 21 also learns the source MAC address data (D1-D1-D1-D1-D1) of the second domain packet 62b to update the gateway MAC table data 210.

Figure 7:
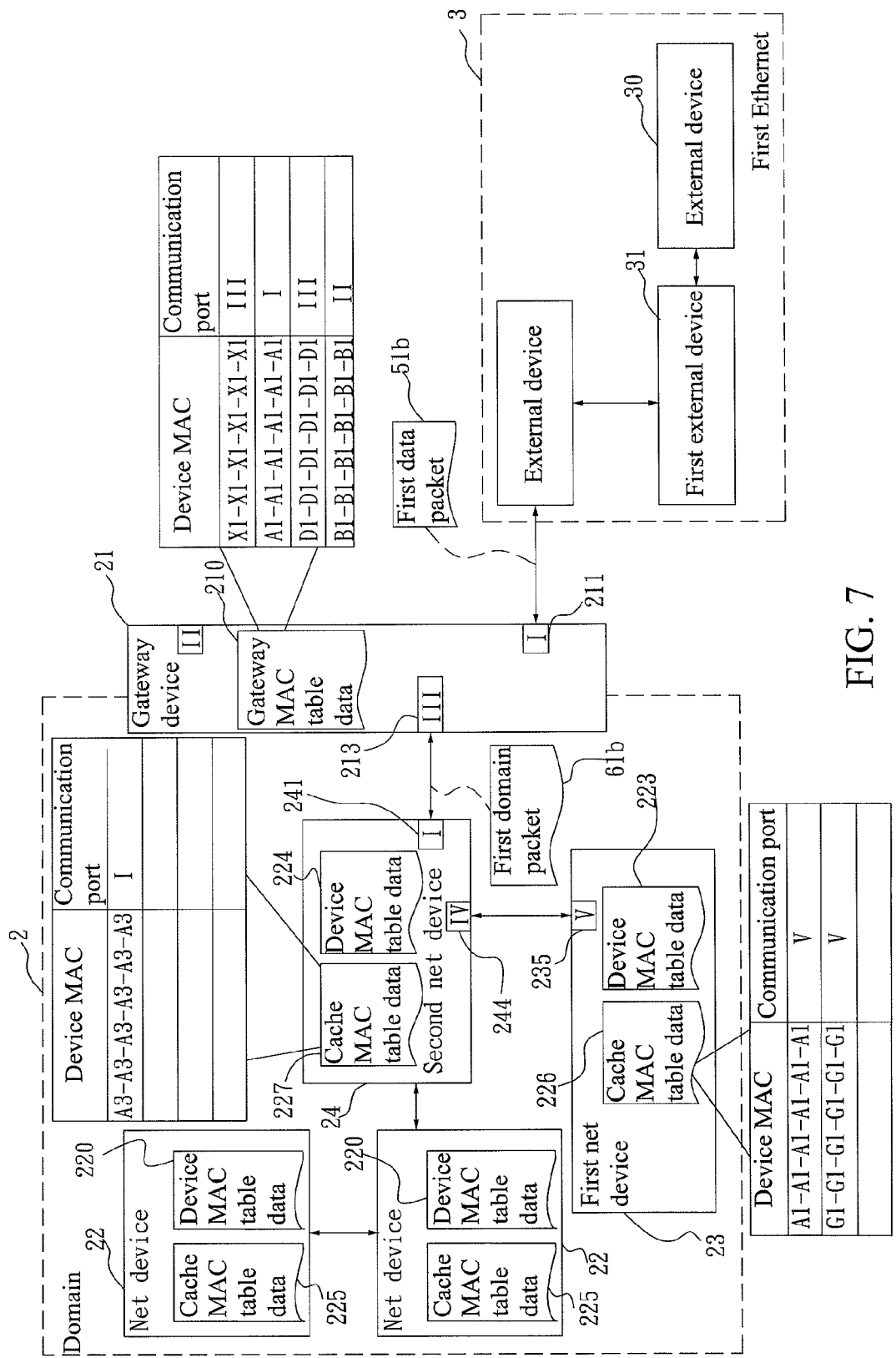
FIG. 7 is a schematic view of a cache MAC table data and an application thereof in a domain gateway control system according to an embodiment of the present invention.

FIG. 7 is a schematic view of a cache MAC table data and an application in a domain gateway control system according to an embodiment of the present invention. A difference from the aforementioned embodiments lies in that each net device 22 in the domain is configured with a cache MAC table data 225, which is used to record a MAC of an actual sender of a domain packet.

The embodiment shown in FIG. 4 and the No. (4) packet structure shown in FIG. 3 are applied in this embodiment. The first domain packet 61b generated by the gateway device 21 (in the insertion mode) is transmitted in the domain 2. When any one of the net devices 22 acquires the first domain packet 61b and determines that the destination MAC address data of the first domain packet 61b points to the net device 22, besides learning the source MAC address data of the first domain packet 61b, the net device 22 also makes a pair of the original source MAC address data recorded in the data field of the first domain packet 61b and the communication port No. of the communication port receiving the first domain packet 61b and records the pair in the cache MAC table data 225 of the net device 22. For ease of illustration, the cache MAC table data of the first net device 23 is numbered 226, and the cache MAC table data of the second net device 24 is numbered 227.

As shown in FIG. 7, upon acquiring the first domain packet 61b, the second net device 24 learns the source MAC address data (G1-G1-G1-G1-G1-G1) of the first domain packet 61b to update the device MAC table data 224. But the destination MAC address data of the first domain packet 61b is not directed to the second net device 24, so the second net device 24 forwards the first domain packet 61b and does not analyze data in the data field of the first domain packet 61b nor does it record the original data (the device MAC address data of the first external device 31: A1-A1-A1-A1-A1-A1) in the cache MAC table data 227.

Upon acquiring the first domain packet 61b, the first net device 23 learns the source MAC address data (G1-G1-G1-G1-G1-G1) of the first domain packet 61b to update the device MAC table data 223. However, when the first net device 23 analyzes the destination MAC address data of the first domain packet 61b, and determines that first net device 23 shall receive the first domain packet 61b, the first net device 23 retrieves the original source MAC address data from the data field of the first domain packet 61b; that is, the device MAC address data A1-A1-A1-A1-A1-A1 of the first external device 31, makes a pair of the device MAC address data and the communication port No. V and records the pair (A1-A1-A1-A1-A1-A1/No. V) in the cache MAC table data 226.

When the first net device 23 needs to communicate with the first external device 31, the first net device 23 can use the cache MAC table data 226 to generate a packet with a destination MAC address data being A1-A1-A1-A1-A1-A1 and immediately know that the packet must be outputted through the No. V communication port 235. Both a normal data packet format and a domain packet format dedicated to the domain (complying with the MAGP information) are applicable. So, the packet forwarding process is expedited.

Similarly, when the second net device 24 acquires the packet with the destination MAC address data A1-A1-A1-A1-A1-A1, the second net device 24 also reads the cache MAC table data 227 of the second net device 24. But when the cache MAC table data 227 does not record a communication port number data corresponding to the A1-A1-A1-A1-A1-A1, the second net device 24 uses the device MAC table data 224 to determine which communication port number data shall be used to output the packet through a relevant communication port. In addition, when the device MAC table data 224 does not record the communication port number data corresponding to A1-A1-A1-A1-A1-A1, the second net device 24 outputs the packet in a broadcast manner or according to a packet transmission rule, in which the packet transmission rule of the second net device 24 is established in advance by network management personnel.

Figure 8:
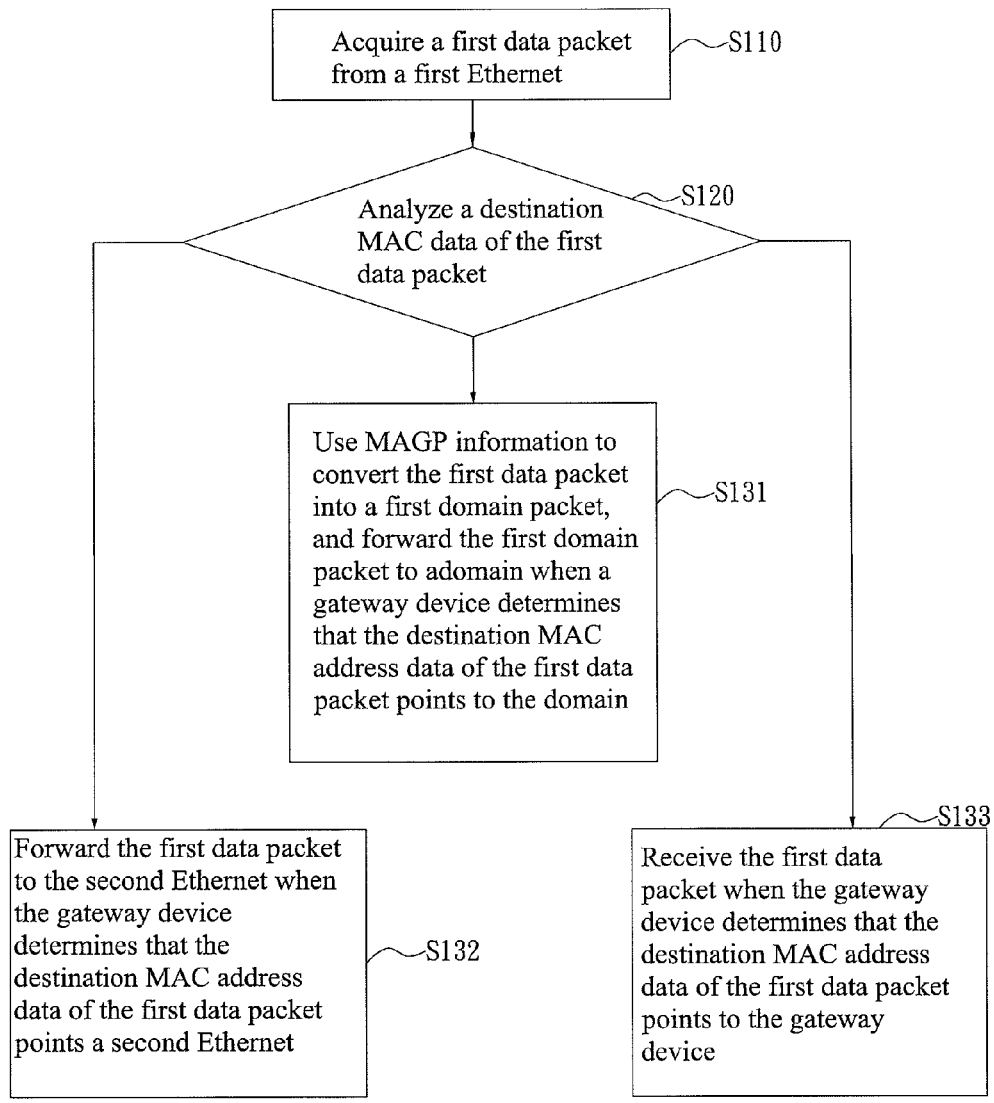
FIG. 8 is a schematic flow chart of a domain gateway control method according to an embodiment of the present invention.

FIG. 8 is a schematic flow chart of a domain gateway control method according to an embodiment of the present invention. Refer to FIG. 2 to FIG. 7 for following illustration of the processes. The method is applicable to the gateway device 21 as shown in FIG. 2. The gateway device 21 is configured at an interface of the domain 2, and is linked to the first Ethernet 3, and the process is illustrated below.

A first data packet is acquired from a first Ethernet (Step S110). As shown in FIG. 4, the first data packet 51b (as shown by the No. (2) structure in FIG. 3) is sent or forwarded by any one of the external devices 30 of the first Ethernet 3. Here, the first external device 31 is an example. The gateway device 21 receives the first data packet 51b from an external device 30 adjacent to the gateway device 21.

The destination MAC address data of the first data packet is analyzed (Step S120). The gateway device 21 reads the destination MAC field of the first data packet 51b, matches the destination MAC field with the gateway MAC table data 210, and determines which device the destination MAC address data of the first data packet 51b points to.

When a gateway device determines that the destination MAC address data of the first data packet points to a domain, the gateway device uses an MAGP information to convert the first data packet into the first domain packet, and forwards the first domain packet to the domain (Step S131). In Step 131, when the gateway device 21 determines that the destination MAC address data of the first data packet 51b points to the domain 2 governed by the gateway device 21, or when the gateway device 21 determines that the first data packet 51b must be forwarded into the domain in a broadcast manner, the gateway device 21 converts the first data packet 51b into the first domain packet 61 according to the MAGP information. The two conversion modes are as follows: (1) substitution and (2) insertion. The two conversion modes are already described in detail in the embodiments of the packet structure conversion in FIG. 3 and in the embodiment of forwarding a packet to a domain in the domain gateway control system in FIG. 4, and are not repeated here.

When the gateway device determines that the destination MAC address data of the first data packet points to a second Ethernet, the gateway device forwards the first data packet to the second Ethernet (Step S132). Referring to FIG. 2, upon acquiring the first data packet 51c, the gateway device 21 analyzes the destination MAC address data of the first data packet 51c. After learning the source MAC address data of the first data packet 51c, the gateway device 21 uses the No. II communication port 212 to forward the first data packet 51c to the second Ethernet 4 according to records in the gateway MAC table data 210.

When the gateway device determines that the destination MAC address data of the first data packet points to the gateway device, the gateway device receives the first data packet (Step S133). Referring to FIG. 2, when the gateway device 21 acquires the first data packet 51d from the first Ethernet 3 and determines that the destination MAC address data of the first data packet 51d matches the gateway MAC address data, the gateway device 21 directly receives the first data packet 51d and no longer forwards the first data packet 51d.

After the learning procedure is applied in the gateway device to acquire and analyze the first data packet, a learning procedure of a gateway device is processed. The gateway device 21 learns the source MAC address data of the first data packets (51a, 51b, 51c, 51d). The gateway device 21 makes pairs of the communication port Nos. of the communication ports receiving the first data packets (51a, 51b, 51c, 51d) and the source MAC address data, and then records the pairs in the gateway MAC table data 210.

Figure 9:
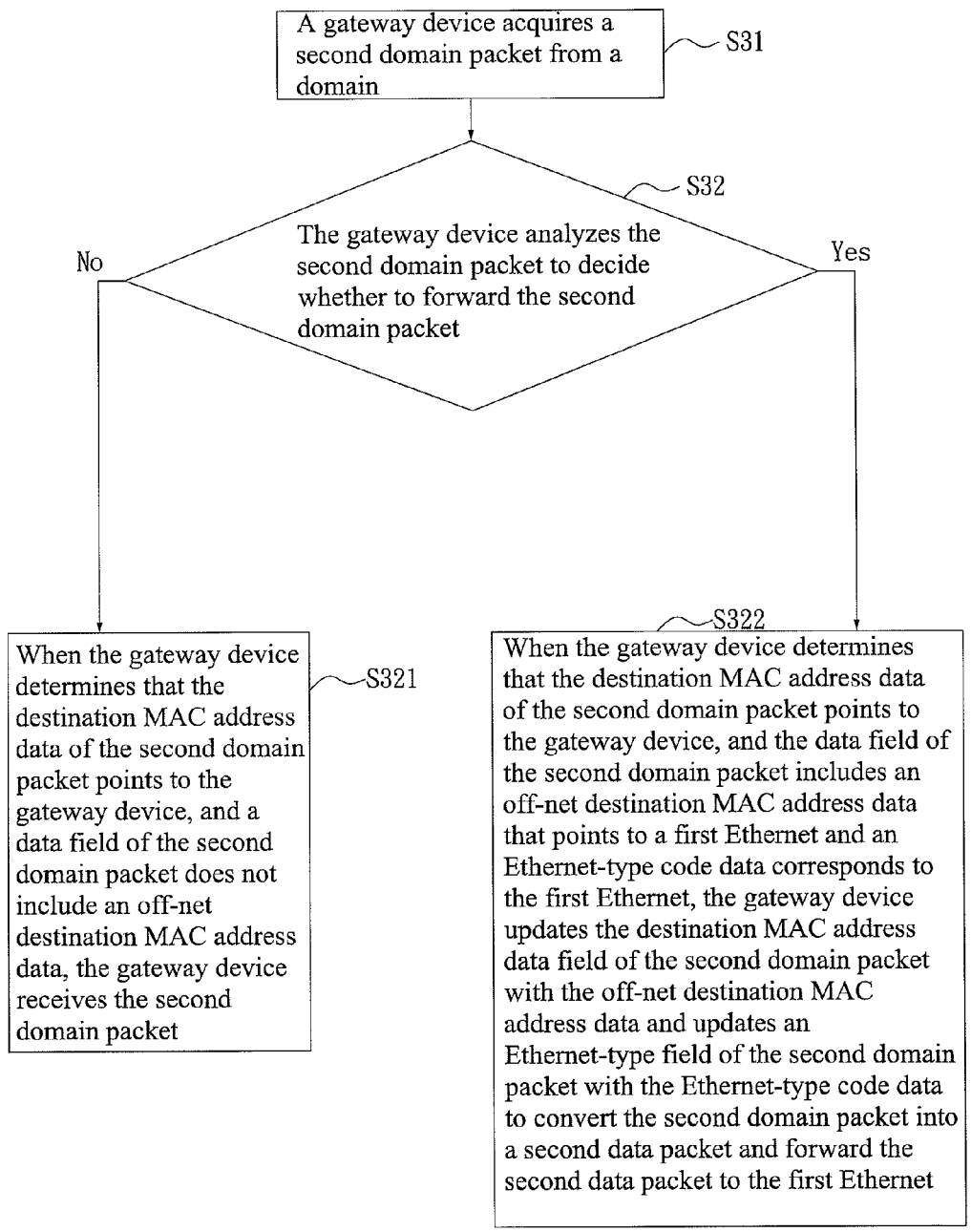
FIG. 9 is a schematic flow chart of sending out a domain packet in a domain gateway control method according to the present invention.

FIG. 9 is a schematic flow chart of sending out a domain packet in a domain gateway control method according to the present invention. The process of sending out a domain packet includes the following steps:

A gateway device acquires a second domain packet from a domain (S31). As shown in FIG. 5 and FIG. 6, the second domain packet 62a generated by any one of the net devices 22 in the domain 2 has the No. (1) packet structure as shown in FIG. 6. Alternatively, the second domain packet 62b generated by any one of the net devices 22 in the domain 2 has the No. (2) packet structure as shown in FIG. 6. The illustration of the architectures is provided in detail before, and is not repeated here.

The gateway device analyzes the second domain packet to decide whether to forward the second domain packet (Step S32), and the step includes the following multiple analysis results.

(1) When the gateway device determines that the destination MAC address data of the second domain packet points to the gateway device, and a data field of the second domain packet does not include an off-net destination MAC address data, the gateway device receives the second domain packet (Step S321). As shown in FIG. 6 and FIG. 5, the data field of the second domain packet 62b does not record any off-net destination MAC address data so that the gateway device 21 determines that the gateway device 21 shall receive the second domain packet 62b.

(2) When the gateway device determines that the destination MAC address data of the second domain packet points to the gateway device, and the data field of the second domain packet includes an off-net destination MAC address data that points to a first Ethernet and an Ethernet-type code data corresponds to the first Ethernet, the gateway device updates the destination MAC address data field of the second domain packet with the off-net destination MAC address data and updates an Ethernet-type field of the second domain packet with the Ethernet-type code data to convert the second domain packet into a second data packet and forward the second data packet to the first Ethernet (Step S322).

When the gateway device 21 analyzes and confirms that the second domain packet 62a complies with the sending out format of a domain packet in the MAGP information, the gateway device 21 converts the second domain packet 62a from the No. (1) packet structure as shown in FIG. 6 into the No. (2) packet structure as shown in FIG. 6, and forwards the second data packet 52 to the first Ethernet 3. Details are shown in FIG. 5 and FIG. 6, and are not repeated herein.

Moreover, a net device learning a device MAC address data in a domain gateway control method is processed. Any net device acquires a first domain packet, and the net device is configured in a domain. The net device makes a pair of the source MAC address data of the first domain packet and the communication port number data of the communication port receiving the first domain packet, and records the pair in a device MAC table data of the net device.

As shown in FIG. 3 and FIG. 4, when the second net device 24 analyzes that the destination MAC address data of the first domain packet 61b is different from the device MAC address data, the second net device 24 reads the device MAC table data 224 to learn that the first domain packet 61b shall be forwarded from the No. IV communication port 244. Before forwarding, the second net device 24 determines whether the source MAC address data of the first domain packet 61b exists in the device MAC table data 224 to decide whether to learn the source MAC address data of the first domain packet 61b.

However, in the process, a cache MAC table data of a net device may also be further established. The net device further makes a pair of the original source MAC address data and the communication port number data of the communication port receiving the first domain packet and records the pair in the cache MAC table data of the net device.

As shown in FIG. 7, upon acquiring the first domain packet 61b, the second net device 24 gets the original source MAC address data (A1-A1-A1-A1-A1-A1) from the data field of the first domain packet 61b, makes a pair of the device MAC address data and the communication port No. I, and records the pair in the cache MAC table data 227.

Figure 10:
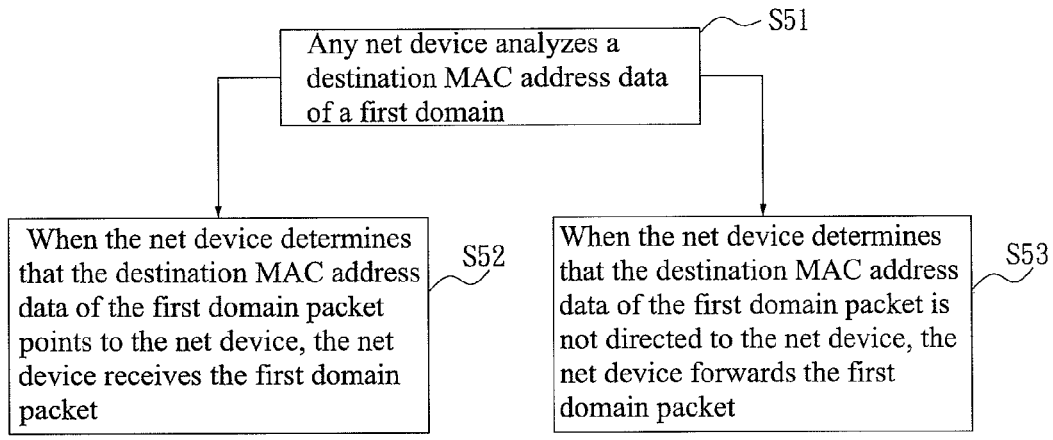
FIG. 10 is a flow chart of a net device forwarding a packet in a domain gateway control method according to the present invention.

FIG. 10 is a flow chart of a net device forwarding a packet in a domain gateway control method according to the present invention. The packet forwarding process includes the following steps.

Any net device analyzes the destination MAC address data of the first domain packet (Step S51). When the net device determines that the destination MAC address data of the first domain packet points to the net device, the net device receives the first domain packet (Step S52). When the net device determines that the destination MAC address data of the first domain packet is not directed to the net device, the net device forwards the first domain packet (Step S53). The descriptions of the packet forwarding process have been previously disclosed according to the FIG. 3 and FIG. 4 and will not be repeated here.

Figure 11:
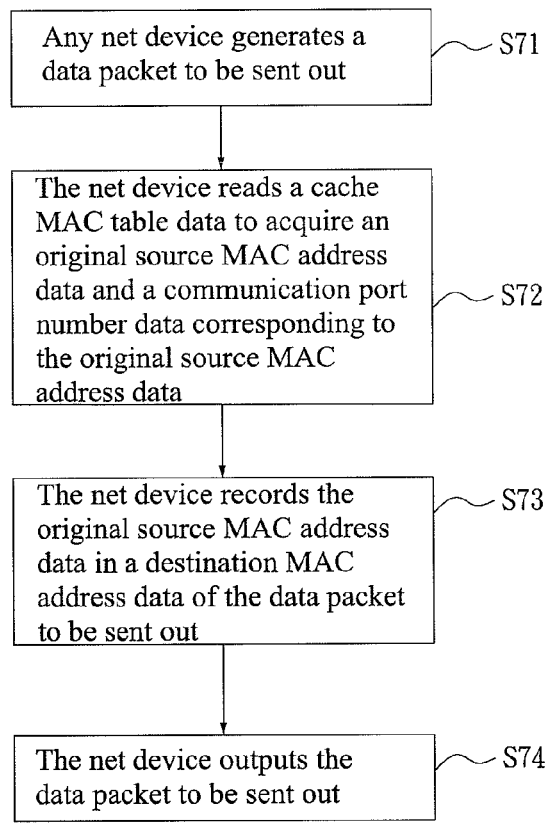
FIG. 11 is a flow chart of a net device establishing a data packet to be sent out in a domain gateway control method according to the present invention.

FIG. 11 is a flow chart of a net device establishing a data packet to be sent out in a domain gateway control method according to the present invention. The process of sending out a data packet includes the following steps.

Any net device generates a data packet to be sent out (Step S71). The net device reads a cache MAC table data to acquire an original source MAC address data and a communication port number data corresponding to the original source MAC address data (Step S72). The net device records the original source MAC address data in a destination MAC address data of the data packet to be sent out (Step S73). The net device outputs the data packet to be sent out (Step S74). The descriptions of the packet forwarding process have been previously disclosed according to the FIG. 7 and will not be repeated here.

Figure 12:
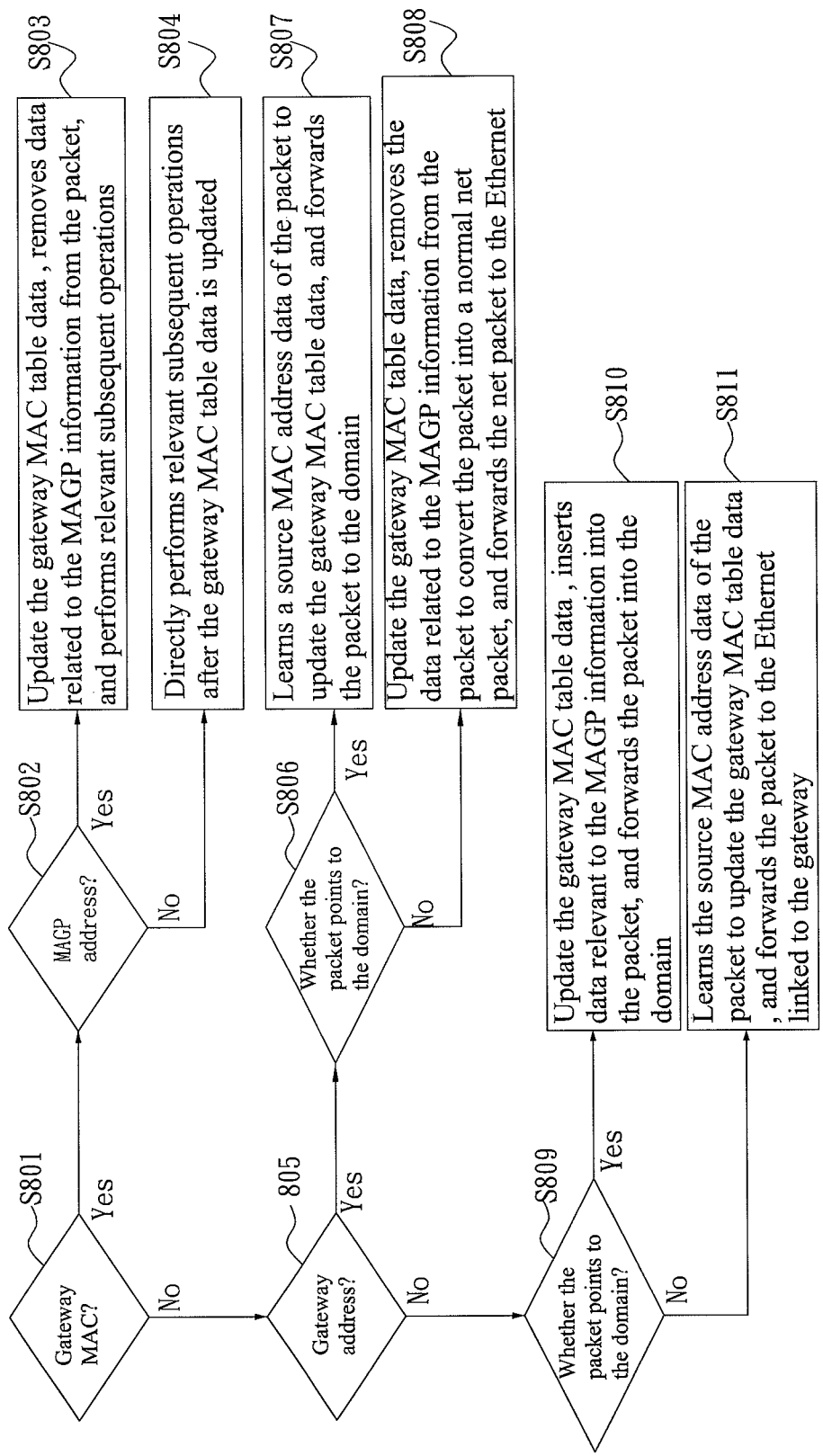
FIG. 12 is a schematic logic diagram of an operation of a gateway device in a domain gateway control system according to the present invention.

FIG. 12 is a schematic logic diagram of an operation of a gateway device in a domain gateway control system according to the present invention. According to the aforementioned embodiments, the operation forms of the gateway device 21 include multiple rules such as packet reception, packet source MAC address data learning and packet forwarding determination. The rules may be designed in operation firmware of the gateway device 21, and the gateway device operates according to the rules in combination with the MAGP information. A logic operation process of the gateway device 21 is as follows.

The gateway device 21 analyzes whether a received packet points to the gateway MAC address data (Step S801). The gateway device 21 reads the destination MAC address data field and the data field of the packet to know exactly which device the packet is actually directed to.

When the packet is actually directed to the gateway device 21, the gateway device 21 determines whether the packet complies with the MAGP information (Step S802) to decide whether to update the gateway MAC table data 210, removes data related to the MAGP information from the packet, and performs relevant subsequent operations (Step S803), or directly performs relevant subsequent operations after the gateway MAC table data 210 is updated (Step S804).

When the packet is not directed to the gateway device 21, the gateway device 21 also determines whether the packet complies with the MAGP information (Step S805).

When the gateway device 21 determines that the packet complies with the MAGP information, the gateway device 21 analyzes whether the packet points to the domain 2 governed by the gateway device 21 (Step S806). If the packet points to the domain 2 controlled by the gateway device 21, the gateway device 21 learns the source MAC address data of the packet to update the gateway MAC table data 210, and forwards the packet to the domain 2 (Step S807). On the contrary, if the packet is not directed to the domain 2 controlled by the gateway device 21 and the gateway device 21 determines that the packet points to an Ethernet linked to the gateway device 21, the gateway device 21 also learns the source MAC address data of the packet to update the gateway MAC table data 210, removes the data related to the MAGP information from the packet to convert the packet into a normal net packet, and forwards the net packet to the Ethernet (Step S808).

After Step S805, when the gateway device 21 determines that the packet does not comply with the MAGP information, the gateway device 21 analyzes whether the packet points to the domain 2 governed by the gateway device 21 (Step S809).

If the packet points to the domain 2 controlled by the gateway device 21, the gateway device 21 learns the source MAC address data of the packet and updates the gateway MAC table data 210, inserts data relevant to the MAGP information into the packet, and forwards the packet into the domain (Step S810). On the contrary, if the packet is not directed to the domain 2 controlled by the gateway device 21 and the gateway device 21 determines that the packet is still directed to an Ethernet linked to the gateway device 21, the gateway device 21 also learns the source MAC address data of the packet to update the gateway MAC table data 210, and forwards the packet to the Ethernet linked to the gateway device 21 (Step S811).

Figure 13:
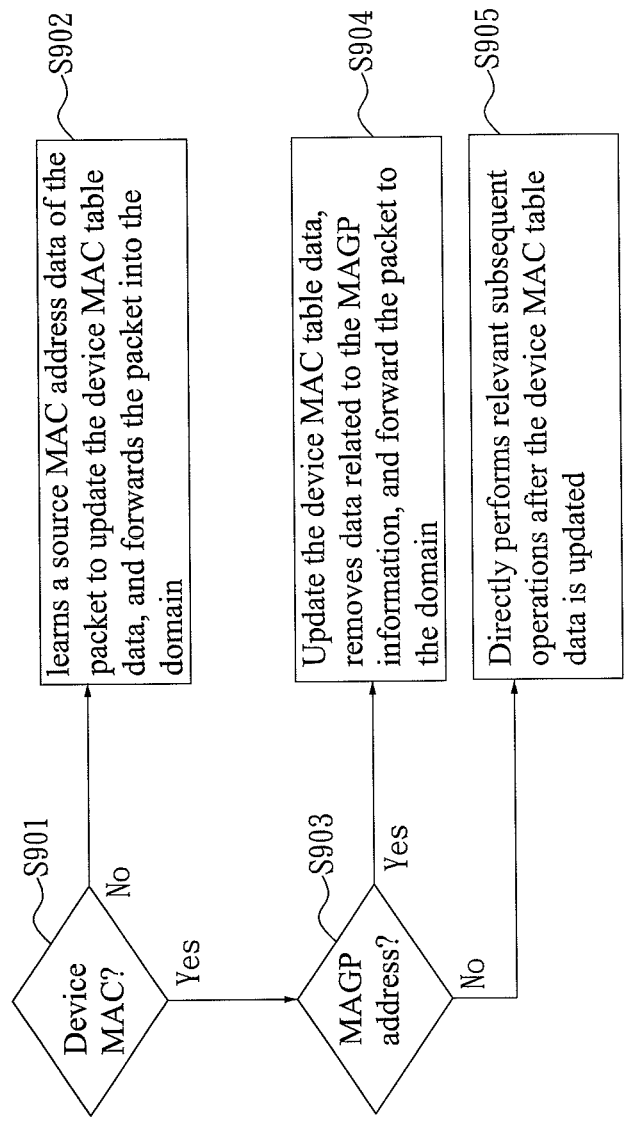
FIG. 13 is a schematic logic diagram of an operation of a net device in a domain gateway control system according to the present invention.

FIG. 13 is a schematic logic diagram of an operation of a net device in a domain gateway control system according to the present invention. According to the aforementioned embodiments, operation functions of the net device 22 include multiple rules such as packet reception, packet source MAC address data learning, and packet forwarding determination. The rules may be designed in operation firmware of the net device 22, and the net device 22 operates according to the rules in combination with the MAGP information. A logic operation process of the net device 22 is as follows.

The net device 22 analyzes whether a received packet points to a device MAC address data (Step S901). When the packet is not directed to the net device 22, the net device 22 learns the source MAC address data of the packet to update the device MAC table data 220, and forwards the packet into the domain 2 (Step S902).

On the contrary, when the packet points to the net device 22, the net device 22 determines if the packet complies with the MAGP information (Step S903) to decide whether to update the device MAC table data 220, removes data related to the MAGP information from the packet, and performs relevant subsequent operations (Step S904), or directly performs relevant subsequent operations after the device MAC table data 220 is updated (Step S905).

However, the net device 22 is a general name of the devices in the domain 2, and includes the first net device 23 and the second net device 24, which are otherwise named only for convenience of illustration. Similarly, the external devices 30 is a general name of the devices in the first Ethernet and the second Ethernet, and includes the first external device 31, the second external device 32 and the third external device 33, which are otherwise named only for convenience of illustration.

In view of the above, the implementation or embodiments of the technical solutions presented by the present invention to solve the problems are described here, but the scope of implementation of the present invention is not limited to the described embodiments. Equivalent variations and modifications in accordance with the claims of the present invention or made according to the claims of the present invention shall fall within the claims of the present invention.

What is claimed is:

1. A domain gateway control system, comprising:
   a domain, wherein a first domain packet is transmitted in the domain, and a domain type code data corresponding to the domain is recorded in an Ethernet-type field of the first domain packet; and
   a gateway device, configured at an interface of the domain and linked to an Ethernet, wherein the gateway device is used to acquire a first data packet from the Ethernet and analyze a destination MAC (media access control) address data of the first data packet;
   when the gateway device determines that the destination MAC address data of the first data packet points to the domain, the gateway device converts the first data packet into a first domain packet by using a MAC Address Group Protocol information, and forwards the first domain packet to the domain; and the MAC Address Group Protocol information comprises: a recorded gateway MAC address data of the gateway device in a source MAC field of the first data packet, and the recorded domain type code data in an Ethernet-type field of the first data packet.

2. The domain gateway control system according to claim 1, wherein the gateway device comprises a gateway MAC table data, the gateway device learns a source MAC address data of the first data packet and records a communication port number data of communication port receiving the source MAC address data in the gateway MAC table data.

3. The domain gateway control system according to claim 1, wherein the gateway device is used to acquire a second domain packet transmitted in the domain, and the gateway device analyzes a destination MAC address data of the second domain packet to decide whether to forward the second domain packet.

4. The domain gateway control system according to claim 3, wherein the gateway device receives the second domain packet when the gateway device determines that the destination MAC address data of the second domain packet points to the gateway device, and a data field of the second domain packet does not include an off-net destination MAC address data.

5. The domain gateway control system according to claim 3, wherein when the destination MAC address data of the second domain packet points to the gateway device and a data field of the second domain packet comprises an off-net destination MAC address data directed to the Ethernet and an Ethernet-type code data corresponding to the Ethernet, the gateway device updates a destination MAC address data field of the second domain packet with the off-net destination MAC address data and updates an Ethernet-type field of the second domain packet with the Ethernet-type code data, to convert the second domain packet into a second data packet and forward the second data packet to the Ethernet.

6. The domain gateway control system according to claim 1, wherein any net device is configured in the domain and the net device comprises a device MAC table data, and the net device acquires a first domain packet and makes a pair of the source MAC address data of the first domain packet and the communication port number data of the communication port receiving the first domain packet, and records the pair in a device MAC table data of the net device.

7. The domain gateway control system according to claim 1, wherein the MAC Address Group Protocol information further comprises a recorded Ethernet-type code data corresponding to the Ethernet and an original source MAC address data in the data field of the first data packet, and the original source MAC address data is a MAC of an external device configured in the Ethernet.

8. The domain gateway control system according to claim 7, wherein any net device configured in the domain comprises a cache MAC table data, the net device is used to acquire the first domain packet, make a pair of the original source MAC address data and communication port number data of a communication port receiving the first domain packet, and record the pair in the cache MAC table data.

9. The domain gateway control system according to claim 8, wherein the net device generates a data packet to be sent out according to the cache MAC table data, records the original source MAC address data in a destination MAC address data of the data packet to be sent out, and outputs the data packet to be sent out through the communication port corresponding to the original source MAC address data.

10. A domain gateway control method, applied in a gateway device, wherein the gateway device is configured at an interface of a domain and is linked to an Ethernet, and the domain gateway control method comprises:
 acquiring a first data packet from the Ethernet; and
 analyzing a destination MAC (media access control) address data of the first data packet through the gateway device; and
 when the gateway device determine that the destination MAC address data of the first data packet points to the domain, using a MAC Address Group Protocol information to convert the first data packet into a first domain packet, forwarding the first domain packet to the domain, wherein the MAC Address Group Protocol information comprises: a recorded gateway MAC address data of the gateway device in a source MAC field of the first data packet, and a recorded domain type code data corresponding to the domain in an Ethernet-type field of the first data packet.

11. The domain gateway control method according to claim 10, wherein:
 when a gateway device determines that the destination MAC address data of the first data packet points to a second Ethernet, the gateway device uses an MAGP information to convert the first data packet into the first domain packet, and forwards the first domain packet to the second Ethernet.

12. The domain gateway control method according to claim 10, wherein:
 when the gateway device determines that the destination MAC address data of the first data packet points to a second Ethernet, the gateway device forwards the first data packet to the second Ethernet.

13. The domain gateway control method according to claim 10, wherein:
 when the gateway device determines that the destination MAC address data of the first data packet points to the gateway device, the gateway device receives the first data packet.

14. The domain gateway control method according to claim 10, further comprising:
 acquiring a second domain packet from the domain; and
 analyzing the second domain packet to decide whether to forward the second domain packet.

15. The domain gateway control method according to claim 14, wherein:
 when the gateway device determines that the destination MAC address data of the second domain packet points to the gateway device, and the data field of the second domain packet includes an off-net destination MAC address data that points to a first Ethernet and an Ethernet-type code data corresponds to the first Ethernet, the gateway device updates the destination MAC address data field of the second domain packet with the off-net destination MAC address data and updates an Ethernet-type field of the second domain packet with the Ethernet-type code data to convert the second domain packet into a second data packet and forward the second data packet to the first Ethernet.

16. The domain gateway control method according to claim 10, further comprising:
 acquiring, by any net device, the first domain packet, wherein the net device is configured in the domain; and
 making a pair, by the net device, of a source MAC address data of the first domain packet and communication port number data of a communication port receiving the first domain packet, and recording the pair in a device MAC table data of the net device.

17. The domain gateway control method according to claim 16, further comprising:
 analyzing the destination MAC address data of the first domain packet by any net device;
 receiving the first domain packet by the net device when determining that the destination MAC address data of the first domain packet points to the net device; and
 forwarding the first domain packet by the net device when determining that the destination MAC address data of the first domain packet is not directed to the net device, the net device.

18. The domain gateway control method according to claim 10, wherein the MAC Address Group Protocol information further comprises a recorded Ethernet-type code data corresponding to the Ethernet and an original source MAC address data in a data field of the first data packet, and the original source MAC address data is a MAC of an external device configured in the Ethernet.

19. The domain gateway control method according to claim 18, further comprising:
- acquiring, by any net device, the first domain packet, wherein the net device is configured in the domain; and
- making a pair, by the net device, of an original source MAC address data and communication port number data of a communication port receiving the first domain packet, and recording the pair in a cache MAC table data of the net device.

20. The domain gateway control method according to claim 19, further comprising:
- generating a data packet to be sent out by any net device;
- reading a cache MAC table data to acquire an original source MAC address data and a communication port number data corresponding to the original source MAC address data by the net device;
- recording the original source MAC address data in a destination MAC address data of the data packet to be sent out by the net device; and
- outputting the data packet to be sent out by the net device.

* * * * *